United States Patent [19]

Snell

[11] Patent Number: 5,257,813
[45] Date of Patent: Nov. 2, 1993

[54] STEERING COLUMN TILT ASSIST

[76] Inventor: William M. Snell, 5113 N. Georgetown, Grand Blanc, Mich. 48439

[21] Appl. No.: 948,555
[22] Filed: Sep. 23, 1992
[51] Int. Cl.$^5$ .............................................. B62D 1/18
[52] U.S. Cl. ....................................... 280/775; 74/493
[58] Field of Search ............................ 280/775; 74/493

[56] References Cited

U.S. PATENT DOCUMENTS

| | | | |
|---|---|---|---|
| 4,307,626 | 12/1981 | Sanada et al. | 280/775 |
| 4,530,254 | 7/1985 | Toyoda et al. | 74/493 |
| 4,648,624 | 3/1987 | Mouhot et al. | 280/775 |
| 4,892,330 | 1/1990 | Beauch | 74/493 |

*Primary Examiner*—Eric D. Culbreth
*Attorney, Agent, or Firm*—Edward A. Craig

[57] ABSTRACT

A tilt assist for a tiltable steering column of an automotive vehicle is provided and includes a double torsion spring having spaced coils mounted on opposite sides of the steering column. A U-shaped wire element connected to the two coils bears against the steering column and urges it in an upward direction. Spacers are disposed within the coils to prevent twisting and distortion.

6 Claims, 3 Drawing Sheets

STEERING COLUMN TILT ASSIST

This invention relates generally to tilt steering columns for automotive vehicles and refers more particularly to a tilt assist to aid in tilting the steering column to adjusted position.

BACKGROUND AND SUMMARY OF THE INVENTION

It is known to provide a spring-type assist to urge the steering column upwardly when the clamping mechanism for locking the steering column in adjusted position is released.

The tilt assist of the present invention as disclosed herein has a balanced action in that it comprises a double torsion spring having spaced coils mounted on opposite sides of the steering column, and a wire element connected to the spaced coils bearing against the steering column and urging it in an upward direction. Preferably the spaced coils and wire element are portions of a single continuous length of flexible resilient, spring wire material.

In a preferred embodiment of the invention, spacers are provided for the coils to minimize or prevent twisting and distortion thereof. The spacers preferably comprise partially cylindrical bodies secured within the coils, having a radius slightly less than the turns of the coils so that the coils will not bind on the spacer bodies.

It is an object of the invention to provide a tilt assist for the steering column of an automotive vehicle having the above features.

It is a further object to provide a tilt assist for the steering column of an automotive vehicle which is composed of a relatively few simple parts, is capable of being easily manufactured and assembled, is rugged and durable, and is well designed for the accomplishment of its intended function.

Other objects, features and advantages of the invention will become more apparent as the following description proceeds, especially when considered with the accompanying drawings.

BRIEF DESCRIPTION OF THE DRAWINGS

FIG. 5 is an enlargement of a portion of FIG. 1.

DETAILED DESCRIPTION

Referring now more particularly to the drawings, the steering column 10 comprises a steering shaft 12 on one end of which is secured the steering wheel 14. The other end is connected to the steering mechanism (not shown) and pivots about pivot 16. The steering shaft is supported for rotation in an elongated tubular housing 18.

Figure 1:
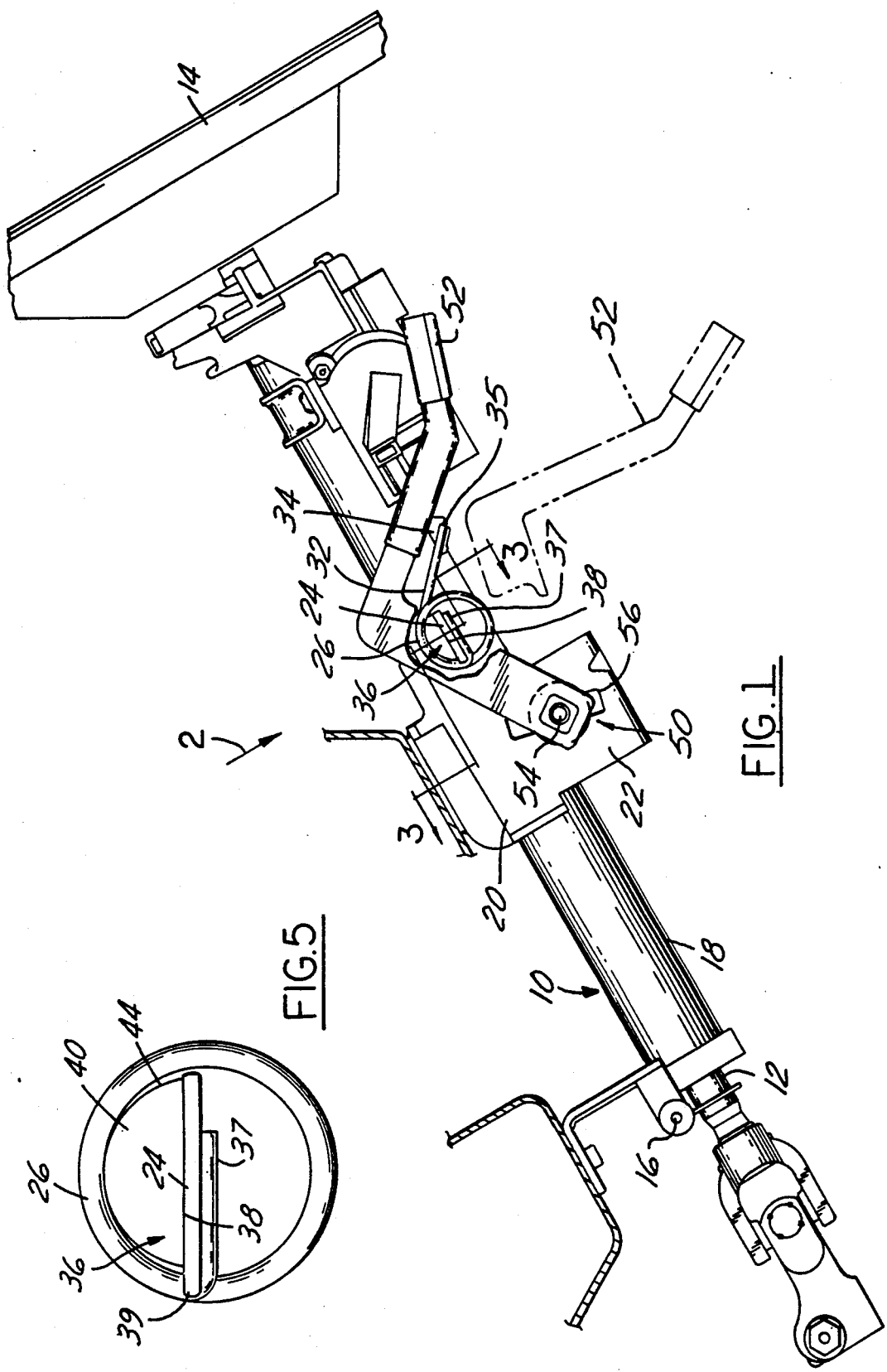
FIG. 1 is a side elevational view of a steering column of an automotive vehicle having a tilt assist constructed in accordance with the invention.
Figure 2:
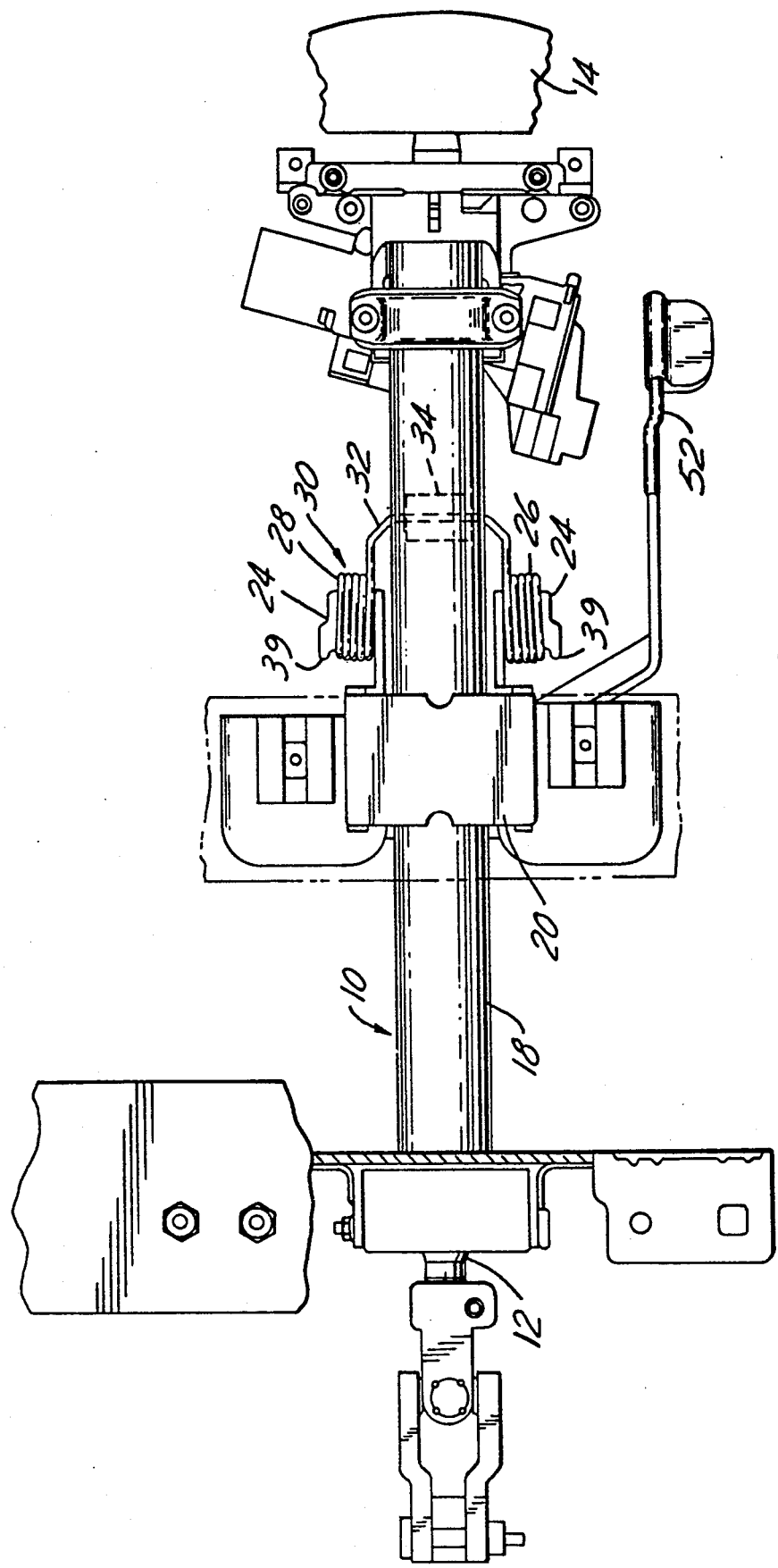
FIG. 2 is a view looking in the direction of the arrow 2 in FIG. 1.
Figure 3:
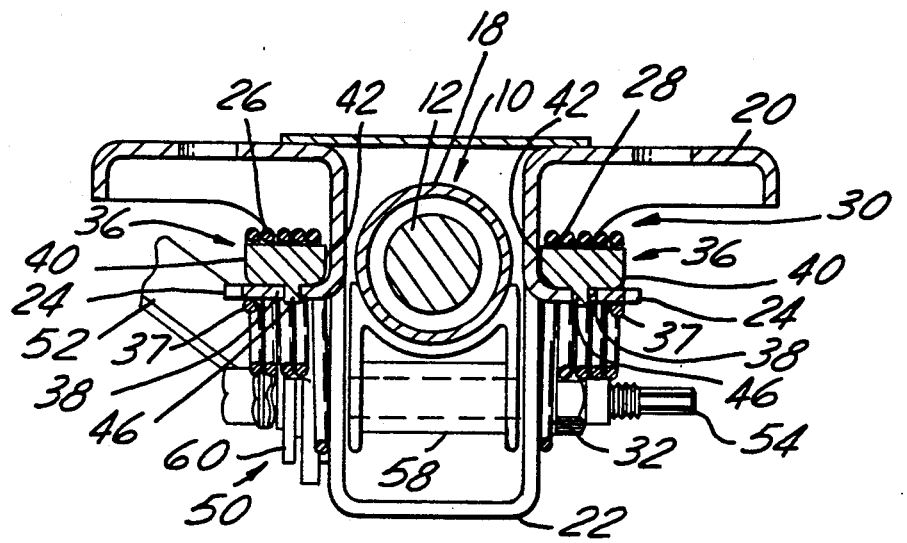
FIG. 3 is a sectional view taken on the line 3—3 in FIG. 1.
Figure 4:
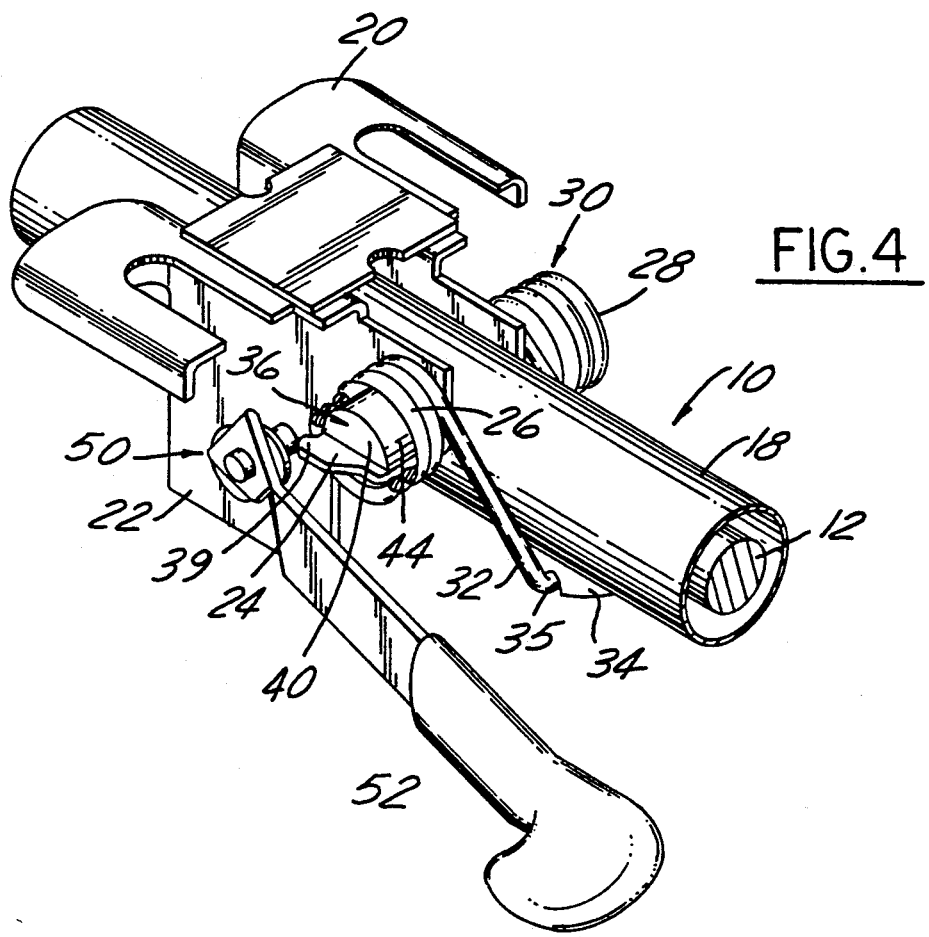
FIG. 4 is a fragmentary perspective view of the tilt assist.

The steering column 10 passes through a channel-shaped bracket 20 which is fixed in relation to the vehicle. The steering column is capable of pivoting up and down within the channel 22 of the bracket about pivot 16. The bracket has laterally spaced, outwardly extending flanges 24 on which are mounted the axially aligned coils 26 and 28 of a double torsion spring 30. The coils are portions of a single continuous length of flexible, resilient spring wire material connected by an integral U-shaped wire element 32 which extends across the steering column and bears in pressure contact with a spring engagement member 34 affixed to the tubular housing 18. The wire element 32 integrally connects at its ends with the innermost generally circular wire segments of the two coils. The wire element 32 extends within a groove 35 in member 34 and imposes a constant spring pressure against the steering column 10 urging it in an upward direction in FIG. 1. The use of two coils on opposite sides of the steering column provides a balanced spring pressure on the steering column.

The flanges 24 are flat, parallel, plate-like members which extend within the coils 26 and 28. The central axes of the coils are parallel to the planes of the flanges. The outermost generally circular wire segments of the coils 26 and 28 terminate in straight end portions 37 disposed flat against the bottom of the flanges 24 to resist rotation of the coils due to the torsion imposed on them by the interaction of the wire element 32 and steering column 10. The flanges 24 have hook-like outer edge portions 39 which overlie the outermost generally circular wire segments of the coils to assist in retaining the coils on the flanges.

Mounted on the top of each flange 24 is a spacer 36 disposed within one of the coils. The spacers 36 are in the form of partial cylindrical bodies, each preferably having a flat rectangular base 38 resting flush upon a flange 24, flat ends 40 and 42 perpendicular to the base, and a cylindrically curved upper surface 44 extending between the ends 40 and 42 and terminating at the longitudinal edges of the base. A projection 46 on the base of each spacer body 36 is rigidly secured a hole in the flange 24 to permanently attach the spacer body thereto. The axes of the coils and of the cylindrically curved upper surface portions 44 of the spacer bodies are parallel.

The space bodies 36 support the coils 26 and 28 and prevent twisting and distortion of the coils and also prevent the wire segments of the coils from being displaced relative to one another by the constant spring pressure reaction of the coils due to the force of the wire element 32 on the steering column. The radius of the cylindrically curved surfaces 44 of the spacer bodies is preferably slightly less than the inside radius of the generally circular wire segments making up each coil, so that the cylindrically curved surfaces 44 contact the wire segments only at the top as seen in FIG. 5. This minimizes binding of the wire segments of the coils on the spacer bodies especially when the steering column is adjusted upwardly or downwardly.

The steering column may be locked in adjusted position by a releasable locking device 50 operated by a handle 52. The locking device 50 may be of any suitable construction and includes a pin 54 extending through elongated slots 56 in the sidewalls of the channel 22 and connected by a stamping 58 to the steering column 10 so that the locking device moves up and down with the steering column. The locking device has a releasable clamping ring assembly 60 operated by the rotation of the handle 52 between the solid and dot-dash line positions in FIG. 1. The locking device forms no part of this invention and, therefore, will not be further described.

What is claimed is:

1. A tilt assist for a tiltable steering column of an automotive vehicle, said tilt assist comprising means for constantly urging said steering column in one direction to aid in tilting said steering column to an adjusted position including a double torsion spring having spaced coils mounted in fixed relation to the vehicle on opposite sides of said steering column, a wire element connected to said spaced coils, said wire element crossing said steering column and urging said steering column in said one direction, a spring engagement member carried by said column with which said wire element is in pressure contact, said spaced coils and wire element being portions of a single continuous length of flexible, resilient, spring wire material, a spacer in supporting engagement within each of said coils to minimize twisting and distortion thereof, said spacers comprising bodies which are at least partially cylindrical, and flanges fixed in relation to the vehicle extending within said respective coils and on which said coils are mounted, said spacer bodies being rigidly secured to said flanges.

2. A tilt device according to claim 1, wherein the central axes of said coils are aligned and extend parallel to the planes of said flanges, and said spacer bodies engage said coils on the top side of said flanges.

3. A tilt device according to claim 2, wherein said spacer bodies have cylindrically curved surfaces opposed to the generally circular wire segments of said respective coils, and the radius of said cylindrically curved surfaces is less than the radius of said wire segments to minimize binding of said wire segments on said bodies.

4. A tilt device according to claim 3, wherein the outermost generally circular wire segments of said coils terminate in straight end portions engaging the undersides of said flanges to resist rotation of said coils.

5. A tilt device according to claim 4, wherein said flanges have hook-like outer edge portions overlying said outermost wire segments to assist in retaining said coils on said flanges.

6. A tilt device according to claim 5, and further including a spring engagement member carried by said column with which said wire element is in pressure contact.

* * * * *

UNITED STATES PATENT AND TRADEMARK OFFICE
CERTIFICATE OF CORRECTION

PATENT NO. : 5,257,813
DATED : November 2, 1993
INVENTOR(S) : H. Snell

It is certified that error appears in the above-indentified patent and that said Letters Patent is hereby corrected as shown below:

ON THE TITLE PAGE, in Assignee block #73, insert --Chrysler Corporation--

Signed and Sealed this

Twenty-first Day of June, 1994

*Attest:*

BRUCE LEHMAN

*Attesting Officer*     *Commissioner of Patents and Trademarks*